F. J. ARBOGAST.
BRICK OR BLOCK AND WALL CONSTRUCTION.
APPLICATION FILED AUG. 18, 1909.
997,596.
Patented July 11, 1911.
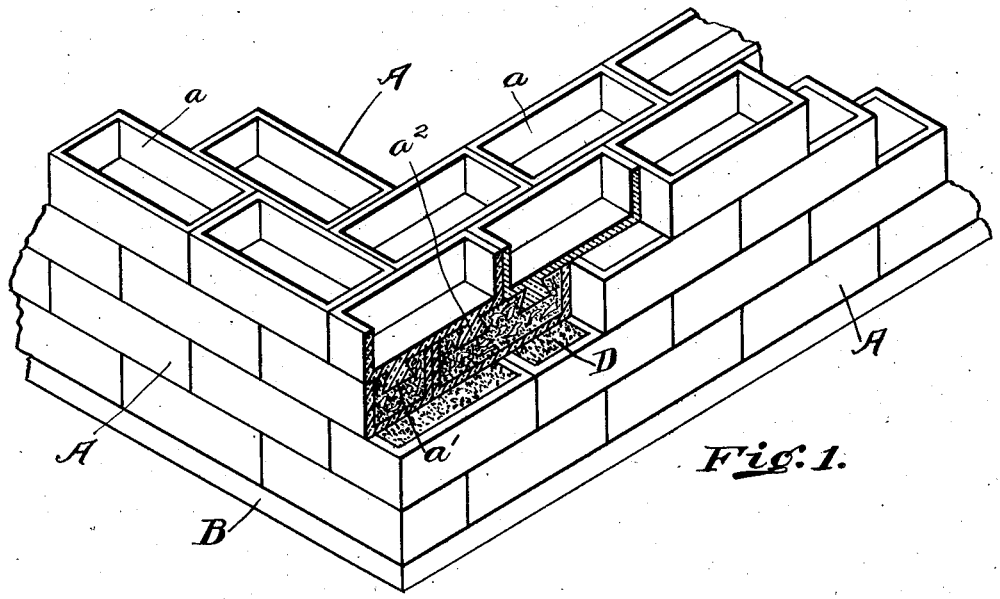
Fig. 1.
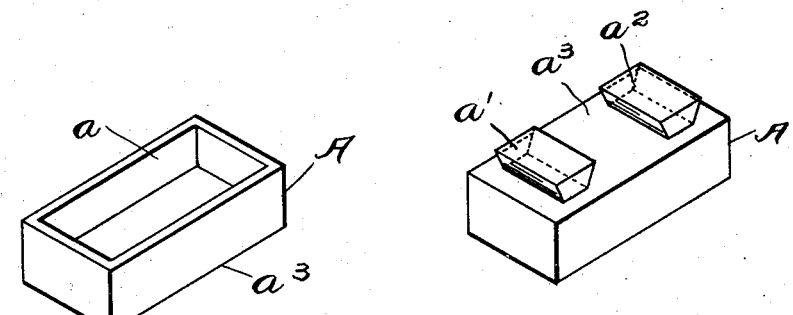
Fig. 2.
Fig. 3.
Witnesses
A. McCormack
M. A. Jones
Inventor
Francis J. Arbogast
By Walter F. Murray
Attorney

UNITED STATES PATENT OFFICE.

FRANCIS J. ARBOGAST, OF FRANKFORT, KENTUCKY, ASSIGNOR, BY DIRECT AND MESNE ASSIGNMENTS, TO STANDARD GLASS BLOCK CO., OF FRANKFORT, KENTUCKY.

BRICK OR BLOCK AND WALL CONSTRUCTION.

997,596.  Specification of Letters Patent.  Patented July 11, 1911.

Application filed August 18, 1909. Serial No. 513,390.

*To all whom it may concern:*

Be it known that I, FRANCIS J. ARBOGAST, a citizen of the United States of America, and resident of Frankfort, county of Franklin, and State of Kentucky, have invented certain new and useful Improvements in Bricks or Blocks and Wall Constructions, of which the following is a specification.

My invention relates especially to glass bricks or blocks and walls constructed thereof. Its object is a brick, which is adapted to be held firmly in place, which is impervious to the action of moisture, acids and other elements to which bricks, or tiles, are ordinarily subjected in use, and by the use of which a wall which is strong in every part may be constructed. This object is attained by the means described in the specification, and illustrated in the accompanying drawings, in which, Figure 1 is a perspective view of a wall embodying my invention, part of the bricks, of the form of my invention, being shown in section, to illustrate their adaptability to form a firm construction at a corner. Fig. 2 is a view of a brick embodying my invention. Fig. 3 is a perspective view of the brick shown in Fig. 3, but in its inverted position.

Referring to the parts: The brick, A, embodying my invention, is made of glass, is open upon the top, $a$, and has lugs, $a'$, $a^2$, upon its bottom, $a^3$. In constructing my wall, the lower row of bricks are placed end to end and have their lugs, $a'$, $a^2$, pressed into a layer of cement, B. The joints between the bricks may be filled in with liquid glass. The hollow bricks are filled with cement, D, to the level of their tops, then the next row of bricks is placed upon the first row with the lugs of each brick projecting into the cement of two adjacent bricks of the first row. In turning corners, bricks of my construction are especially adapted for making a firm construction. The formation of a corner is illustrated in Fig. 1. The last brick of a meeting row is placed with its end flush with the side of the last brick of the row which meets it. The last brick of the superimposed row, is placed at the end of the corner with its lugs projecting into the cement of the corner bricks of the lower row. Thus, at a corner, the lugs of the superimposed brick lock the next to last and the last brick of the row below it securely together.

Throughout the specification and claims I have used the term "brick", but I wish it to be understood that the term is intended to cover building blocks.

What I claim is:

1. A glass building block in the shape of a rectangular box, with an open top and with wedge-shaped transverse lugs projecting from its bottom, said lugs being adapted to project into the tops of similar blocks.

2. A glass building block in the shape of a hollow rectangular box, with an open top and with downwardly projecting lugs of a width equal to the width between the inner walls of the sides of the blocks.

FRANCIS J. ARBOGAST.

Witnesses:
 Jos. J. KERNEN,
 C. J. DEWEES.

---

Copies of this patent may be obtained for five cents each, by addressing the "Commissioner of Patents, Washington, D. C."